June 10, 1952      S. R. ETNYRE      2,599,704
DISTRIBUTING SYSTEM FOR BITUMINOUS AND LIKE MATERIAL
Filed Aug. 17, 1946      3 Sheets-Sheet 3
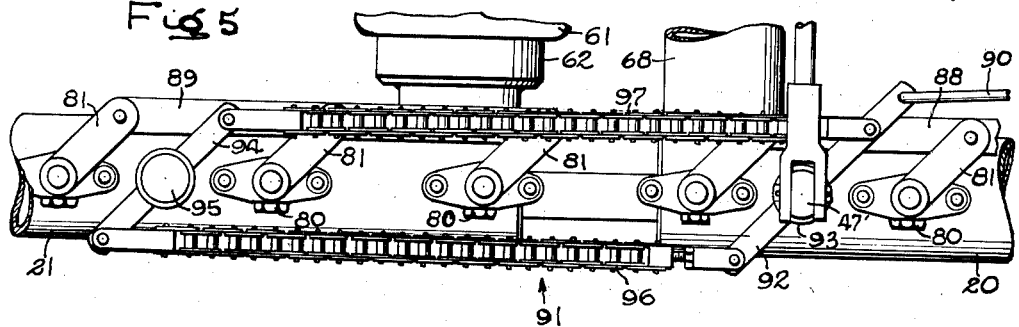
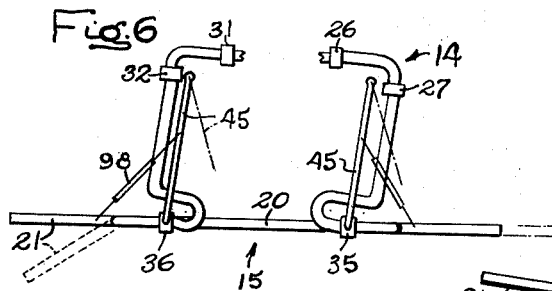
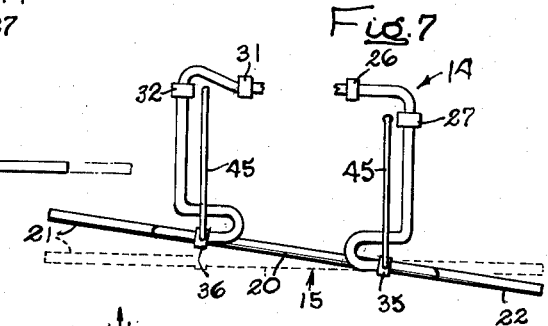
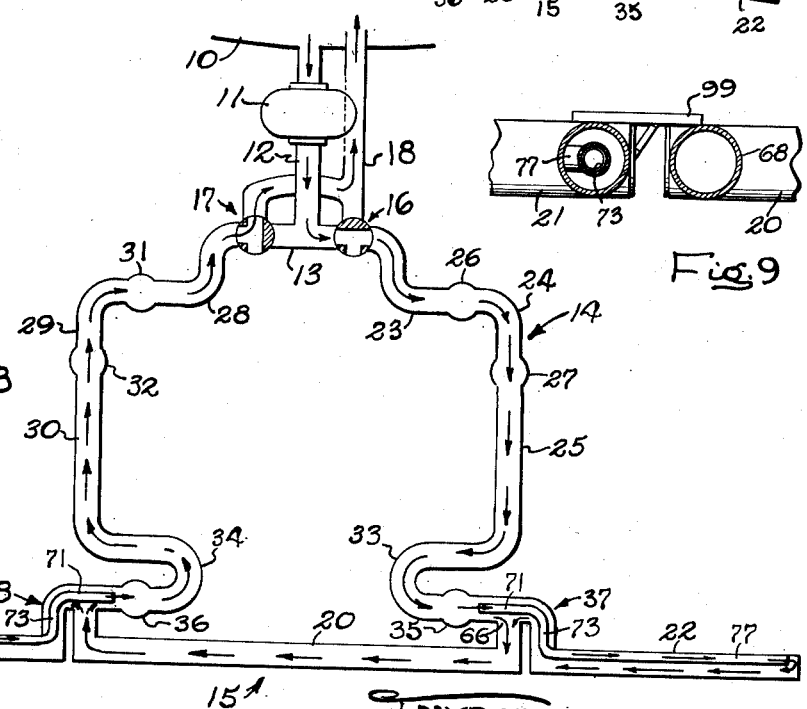
INVENTOR
Samuel R. Etnyre
ATTORNEYS Patented June 10, 1952

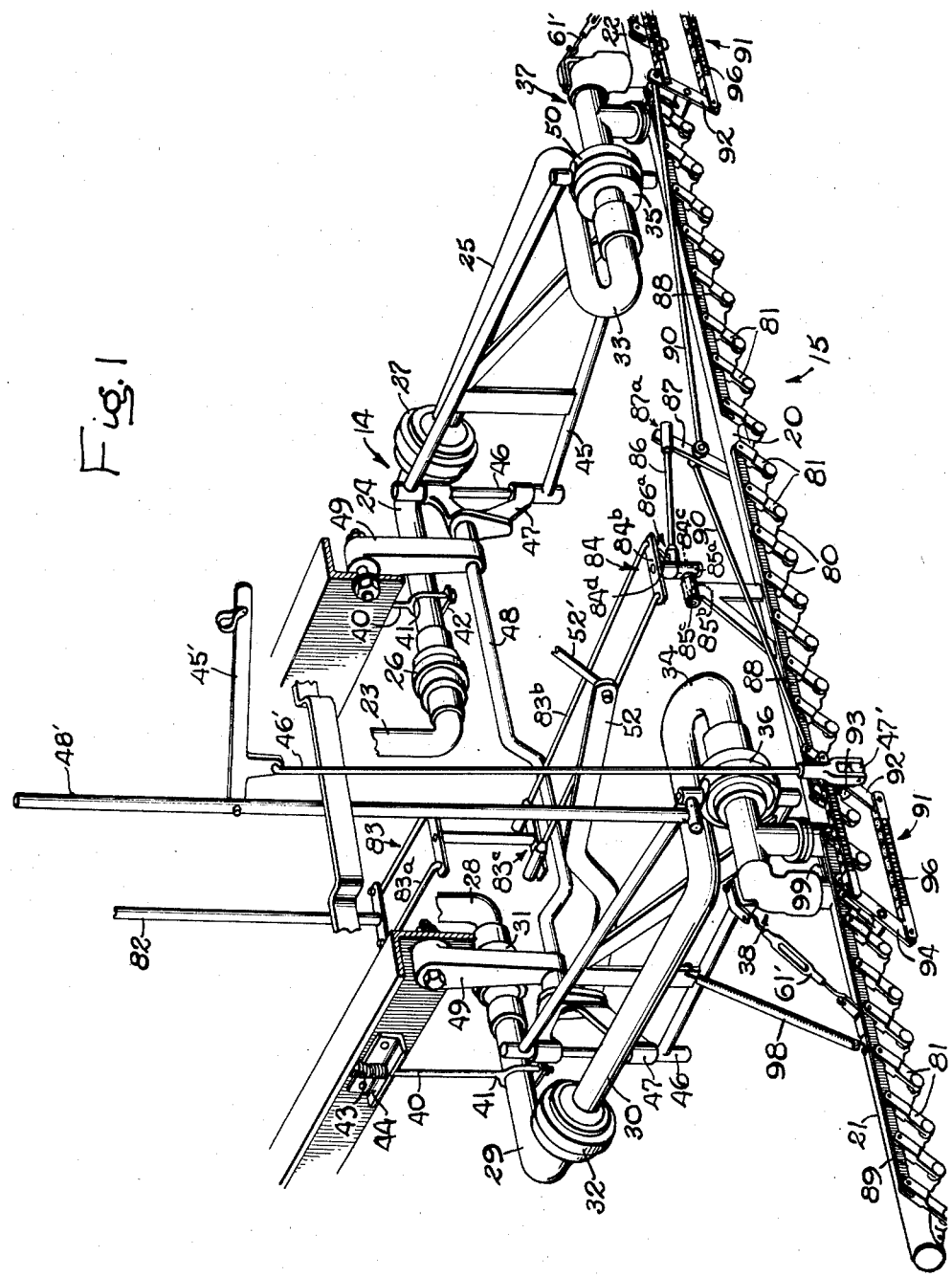

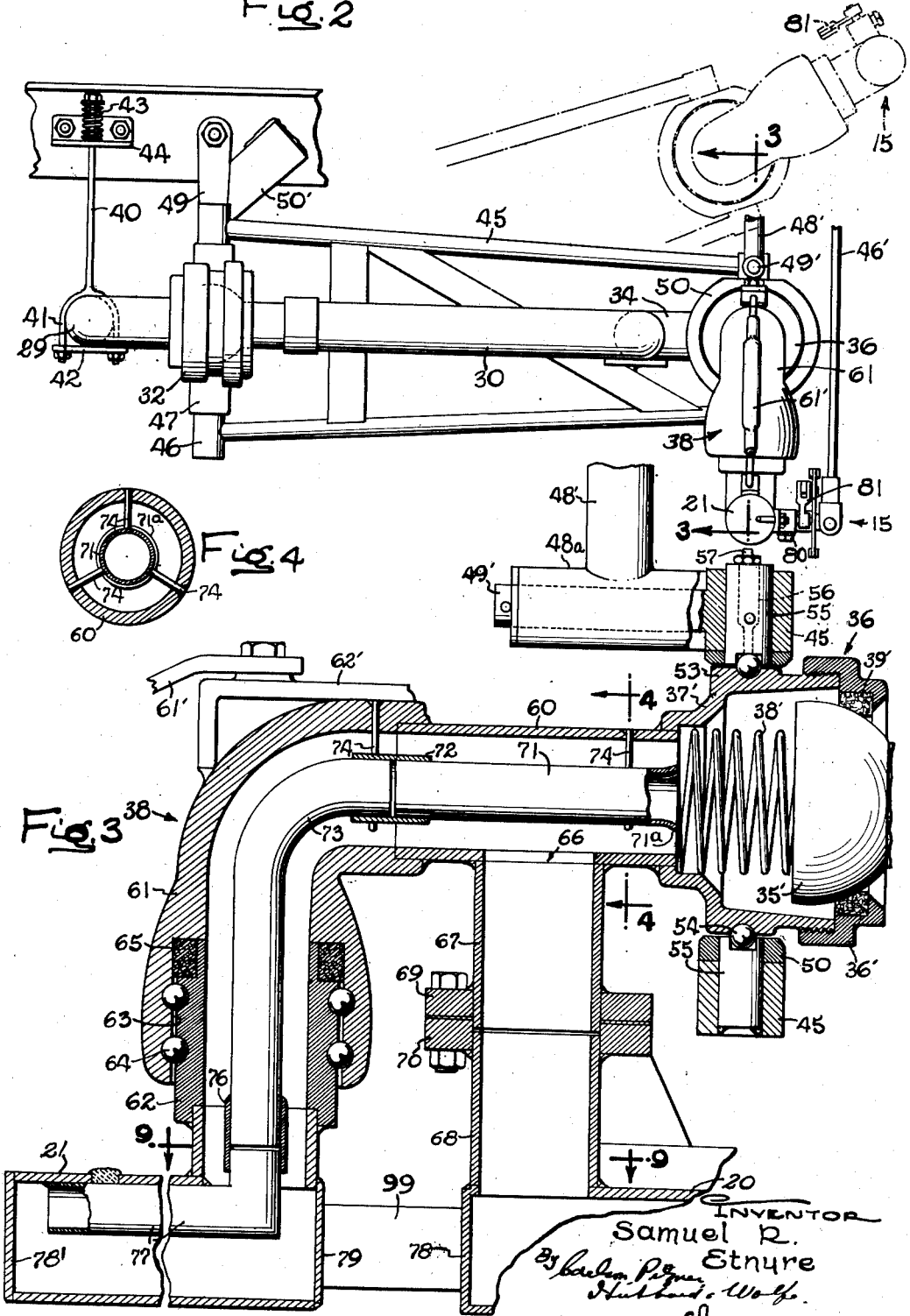

2,599,704

UNITED STATES PATENT OFFICE 2,599,704

DISTRIBUTING SYSTEM FOR BITUMINOUS AND LIKE MATERIAL

Samuel R. Etnyre, Oregon, Ill., assignor to E. D. Etnyre & Co., Oregon, Ill., a corporation of Illinois Application August 17, 1946, Serial No. 691,224

16 Claims. (Cl. 299—34)

The invention relates to apparatus for applying fluid surfacing or binding materials to roadways or the like, and more particularly to an improved material distributing system for such apparatus.

One object of the invention is to provide a distributing system of the above general character, including a sectional or folding distributor bar and a material supply system therefor constructed and arranged to provide for circulation of material through all sections of the bar during nondistributing periods and having the various parts interrelated and supported in an improved manner to provide greater flexibility of adjustment than has been attainable heretofore.

A more specific object is to provide a full circulating fluid distributing system including a sectional distributor bar constructed and arranged so that the end sections may be folded up when not in use and in which the bar and the elements of the supply system are interconnected and supported in a novel manner which permits the bar to be rotated or turned up to a position for effectually drawing residual material therefrom, and the entire assembly to be swung upwardly so as to locate the parts in the most advantageous position for travel and for further facilitating the draining of residual material from the bar and supply system upon completion of a distributing operation.

Another object is to provide an improved distributor bar and supply system therefor in which the parts are shaped and interconnected in a novel manner permitting relative movement of the parts in substantially any direction upon encountering obstructions, so as to minimize damage to the system irrespective of the direction of travel of the distributor and tending in any event to maintain the fluid system free of leakage.

Still another object is to provide a sectional distributor bar supported for movement as a unit into an inverted or draining position and having improved means connecting adjacent sections of the bar for relative swinging movement and providing passages for supplying material to the several bar sections, either for distribution or for continuous circulation through each of the bar sections.

A further object is to provide improved mechanism for actuating the outlet control valves carried by the relatively swingable sections of the distributor bar, which mechanism is simple in construction and efficient in operation, which has no tendency to become entangled with the valves when the sections are folded up for travel, and which prevents the imposition of excessive strains on the mechanism and associated parts when the bar encounters an obstruction in use.

Another object is to provide improved means for operating the spray bar outlet valves which is adapted to accommodate itself to the various adjustable positions of the bar and which is effective to maintain the valves in set position during such adjustment.

Still another object is to provide improved means for supporting the elements of the distributing system so as to hold the elements securely in their adjusted positions while permitting yielding movement of the same when required.

Other objects and advantages of the invention will become apparent from the following detailed description of the preferred embodiment illustrated in the accompanying drawings, in which:

Figure 1 is a perspective view of a fluid material distributing system embodying the features of the invention, the parts being shown in operating position.

Fig. 2 is a fragmentary side view of the system.

Fig. 3 is a sectional view of the distributor bar and the fitting connecting adjacent bar sections, taken in a vertical plane substantially on the line 3—3 of Fig. 2.

Fig. 4 is a transverse sectional view of the fitting taken in a vertical plane substantially on the line 4—4 of Fig. 3.

Fig. 5 is a fragmentary side elevational view of the distributor bar showing details of the valve actuating mechanism.

Figs. 6 and 7 are diagrammatic views showing the positions assumed by the elements of the distributor bar and supply system under different operating conditions.

Fig. 8 is a diagrammatic view showing the flow path of material during its circulation through the distributor bar.

Fig. 9 is a sectional view taken in a horizontal plane substantially on the line 9—9 of Fig. 3.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration, the invention has been shown in a form suitable for distributing bituminous and like material employed in road construction and maintenance, the material being supplied from a tank 10 (Fig. 8) which is usually mounted on a road vehicle such as a truck (not shown). The fluid material to be distributed is withdrawn from the tank by a pump 11 which discharges through a conduit 12 into a header 13. The latter communicates through a conduit system 14 of supply conduits with a tubular distributor or spray bar 15. Suitable valves 16 and 17 provided at opposite ends of the header 13 are settable to direct the material in either direction from the header to the bar 15 for distribution, or for effecting circulation of the material through the bar and through a return conduit 18 to the tank 10 when the outlets for the bar are closed.

Referring to the drawings, the distributor bar 15 as herein shown is made up of three sections, namely, an intermediate section 20 and end sections 21 and 22 pivotally supported to swing or fold on vertical axes relative to the intermediate section, whereby to reduce the clearance required when traveling. The conduit system 14 supplying material to the distributor bar comprises a series of conduit members providing separate branches between the valves 16 and 17 and the opposite ends of the intermediate bar section 20. These conduit members are articulated and interconnected with the distributor bar in a manner providing maximum flexibility. Thus, as shown in Figs. 1 and 6–8, a passage from the valve 16 to the right-hand end of the intermediate distributor bar section 20 (Fig. 1) is provided by supply conduit members 23, 24 and 25 which are interconnected by universal joints 26 and 27. Similar conduit members 28, 29 and 30 connected by universal joints 31 and 32 provide a passage from the valve 17 to the other or left-hand end of the intermediate bar section.

It will be observed that the conduit members are shaped and interconnected so as to extend first generally downward from the valve 16 and 17, then laterally outward and finally in a rearward direction. The universal joints 26 and 31 are located in the lateral extensions of the members and the joints 27 and 32 in the rearward extensions. At their rear ends the conduit members 25 and 30 are formed respectively with U-shaped bends 33 and 34 which project laterally inward from the members and then reversely for connection with the distributor bar by means of universal joints 35 and 36 and fittings 37 and 38. The latter serve additionally to connect adjacent sections of the distributor bar, as will appear presently.

The universal joints 26, 27, 31, 32, 35 and 36 may be of any preferred type, as for example ball and socket joints of the conventional type shown in Fig. 3. Each joint includes a member having a hemispherical ball portion 35' seated in a nut 36' threaded on the open end of a socket member 37'. A coiled spring 38', disposed in the socket member, holds the ball portion 35' of the joint in tight engagement with a packing ring 39' in the nut member and thus effectually seals the joint against leakage of material flowing through the joint.

At its forward end the conduit system is supported directly from the frame of the vehicle by a pair of rods 40 having forked ends 41 respectively straddling the conduit members 24 and 29 and clamped thereto by cross pieces 42 secured in place by nuts threaded on the ends of the rods. The rods are suspended from opposite sides of the vehicle frame, each being yieldably supported thereon by a spring 43 (Figs. 1 and 2) interposed between a nut threaded on the upper end of the rod and an angle bracket 44 rigidly secured to the vehicle frame. The brackets 44 are apertured for the reception of the rods 40, the apertures being dimensioned to permit the rods to swing forwardly or rearwardly when the distributor system is deflected from its normal operating position.

The rear ends of the conduits 25 and 30 are supported for universal movement by a pair of cantilever brackets or arms 45 herein formed by rigid frames (Figs. 1 and 2). At their forward ends these frames are mounted on vertical pivots 46 carried by brackets 47 rotatably mounted on opposite ends of a horizontal rockshaft 48. The shaft is supported by links 49 bolted to the vehicle frame. The bolts upon being drawn up tightly act as clamping members and are effective to frictionally clamp the links in place with respect to the vehicle frame or chassis and yet permit them to yield under the pressure applied through the arms 45 when the distributor bar meets an obstruction. In the normal operation of the apparatus, the links 49 are positioned so that the shaft 48 is substantially alined with the universal joints 27 and 32 so that the supporting arms 45 and the conduit members 25 and 30 have a common pivotal axis for swinging the bar to the traveling position. A stop member 50' may be provided on the vehicle frame for locating the links 49 in their normal operating positions.

At their rear ends, the cantilever arms 45 are connected with the universal joints 35 and 36 in a manner such as to permit the distributor bar to swing easily between a lower operating position and an upper draining position. For this purpose each arm is provided at its rear end with an annular bearing member 50 adapted to encircle one of the members of each universal joint. As shown in detail in Fig. 3, the socket member 37' of each universal joint 35, 36 is formed with a peripheral bearing surface 53 for cooperation with the member 50, the member and surface being complementally grooved to provide a raceway for a series of ball bearings 54. The bearing members 50 are secured to the arms 45 for pivotal movement about axes parallel to the forward pivot pins 46 of the arms to permit the members to conform to the portions of the distributor bar when the bar is deflected, as shown in Fig. 6 or 7. For this purpose the bearing members are provided with trunnions 55 seating in opposed bores in the rear ends of the associated arms. One of the trunnions, preferably the uppermost one, may be formed with an internal passage 56 and provided with a lubricating fitting 57 for supplying lubricant to the ball bearings 54.

It will be seen that the conduit system is so connected with the distributor bar and so supported as to permit a high degree of flexibility not only for the purpose of avoiding damage to the bar and to the system but to permit movement of the bar into various positions. The location of the universal joints as above described is an important factor in providing this high degree of flexibility. Thus the joints permit the distributor bar and associated conduit members to be shifted laterally of the vehicle, either to the left as shown in Fig. 6, or to the right of the vehicle to clear an obstruction without bending any of the parts and without imposing sufficient strain on the joints to cause leakage. Moreover, the distributor bar may be deflected as a unit either forwardly or rearwardly without damage to the supply system (Fig. 7). More particularly, the joints permit movement of the distributor bar to positions disposed at an angle to the normal position of the bar transversely of the path of the vehicle, in case either end of the bar encounters an obstacle when the vehicle is moving either forwardly or backward. In Fig. 7, the bar is shown in one such deflected position, the normal position being shown in broken lines.

Also, it will be observed that the distributor bar is advantageously supported through the medium of cantilever arms 45 for lateral or endwise movement as well as for up and down swinging movement. Additionally, the bar is capable of rotating on the axes of the joints 35, 36 from a lower operating position as shown in full lines in Fig. 2 through approximately ninety degrees into a raised or draining position as shown in broken lines in said figure.

To provide for convenient operation of the distributor bar to cause it to be rotated on the axes of the joints 35, 36 from its normal operative position into elevated or draining position and vice versa, a suitable manually operable link and lever mechanism is employed. As shown in Figs. 1, 2 and 3, this mechanism comprises a hand lever 45' connected by a link 46' with a boss 47' rigid with and projecting rearwardly from the intermediate bar section 20. At its forward end the lever 45' is fulcrumed on an upright rod 48' pivotally mounted at its lower end on the forward end of one of the arms 25 (herein the left-hand arm). As shown (Fig. 3), the lower end of the rod has a cross member 48a at its lower end bored to receive a transverse pin 49' projecting laterally from one of the arms 45. The rod 48' may be guided by suitable means (not shown) on the machine frame. Being pivotally supported at its lower end, it does not interfere with the swinging movements of the bar as permitted by the joints 27, 32.

Any suitable means may be provided to effect a manual swinging of the bar on the joints 27, 32. Herein shown for this purpose is a lever arm 52 rigid with one of the brackets 47. The free end of the arm may be connected by a link 52' with a hand lever or the like (not shown) located at a convenient point on the truck.

As above indicated, the fittings 37 and 38 serve to connect the end sections of the distributor bar to the opposite ends of the intermediate section. Alike in construction, each comprises a tubular body 60 (Fig. 3) having an opening at one end communicating with the conduit system, in this instance through one or the other of the universal joints 35 or 36. As shown in Fig. 3, the body 60 of the fitting 38 at the left-hand end of the distributor bar is secured, as by welding, to the socket member 37' of the universal joint 36. At its other end the body 60 opens into and is welded or otherwise rigidly secured to an elbow member 61 which provides a laterally opening outlet for the associated end bar section 21. The bar section is pivotally secured in the elbow member by a transversely projecting sleeve 62 rigid with the bar section and engaging in a socket 63 in the member 61.

Preferably ball bearings 64 are provided in the socket 63 to insure easy swinging of the bar section to a folded position at right angles to the longitudinal axis of the distributor bar. Packing rings 65 interposed between the end of the sleeve 62 and the base of the socket 63 prevent leakage of material through the joint. To relieve the strain on the joints, the end sections of the bar may be supported by adjustable links 61' (Figs. 1 and 3). As shown, each link is pivotally secured at one end of its bar section and at the other end to the adjacent fitting.

To establish communication between the end sections of the bar and the intermediate section, the body 60 of each fitting 37, 38 has an outlet opening 66 connected by nipples 67 and 68 with one end of the intermediate bar section. These nipples project transversely of the bar parallel with one leg of the elbow 61 and coact with the elbow to form a U-shaped passage for the material. The ends of the nipples 67 and 68 may be formed with abutting outwardly turned flanges 69 and 70 to facilitate their interconnection.

As apparatus of the type with which the invention is concerned is used extensively for the distribution of hot asphalt and other similar bituminous materials which are solid at normal temperatures, provision is made for circulating the material through the three sections of the distributor bar and the conduit system to prevent the material from solidifying therein between distributing operations. For this purpose, end sections 21, 22 and each of the fittings 37, 38 are equipped with inner circulating pipes or conduits of reduced cross-sectional area. Each conduit comprises a tube 71 connected by a coupling 72 with a similarly dimensioned angularly bent tube 73 extending through the elbow member 61. The tubes 71 and 73 in this instance are disposed coaxially in the body 60 and elbow member 61 and are supported therein by radially disposed rods 74, as shown in Figs. 3 and 4. At its outer end the tube 73 is connected by a coupling 76 with the right angularly facing end of a tube 77 which extends longitudinally through the end bar section 21. The end portion of the tube 77 is loosely received in the coupling 76 and the tube proper preferably extends along the side wall of the end bar section 21 and is secured thereto by welding or otherwise. This construction permits the end sections 21, 22 of the bar to turn relative to the fittings on axes extending perpendicular to the bar thereby permitting the end sections to swing upon encountering any obstructions, as shown in broken lines in Fig. 6.

As shown in Fig. 3, the tube 77 terminates inwardly from the end of each bar section which is closed by a suitable plug 78, and the tube 71 extends past the opening 66 so as to open into the member 37' of the joint 35 or 36, as the case may be. In the construction shown, the plug 78 is welded to the end bar section, but it will be appreciated that it may have a threaded connection therewith for convenient removal and attachment of an extension to the bar section. At its inner end, the bar section 21 is closed by a plug 79 and similar plug 78' close the adjacent ends of the intermediate bar section 20.

It will be apparent that the construction above described provides a pair of contiguous flow passages extending through each fitting 37, 38 and through the end bar sections 21, 22 with the outer one of such passages in communication with the adjacent end of the intermediate bar section 20 by way of the opening 66. The tube 71 extends across the opening 66 of the body 60 substantially to the inlet opening at the end of the body and forms with the body an annular passage of a cross-sectional area substantially less than that of the opening 66. Thus a pressure differential is established between the inner end of the tube 71 and the opening 66 when fluid is supplied thereto either by way of the end opening or from the intermediate opening 66. The extent of this pressure differential is determined by the relative cross-sectional areas of the opening 66 and the annular passage particularly at a point between the opening 66 and the inner end of the tube 71, and it will be understood that such pressure differential may be varied as by changing the size of the tube 71 throughout its length or by flaring the inner end of the tube as shown at 71a (Fig. 3) in order to provide the value required for any material commonly distributed by the apparatus. Flaring of the inner end of the tube 71 is advantageous in that it renders possible the use of a tube of smaller diameter.

When the valves 16 and 17 are set as shown in Fig. 8, fluid material is delivered under pressure through the conduit members 23, 24 and 25 to the inlet opening of the fitting 37, and after circulation through the three sections of the distributor bar 15 is returned through the fitting 38, conduit members 30, 29 and 28 and return duct 18 to the tank 10 in the flow path indicated by the series of arrows in Fig. 8.

Referring more in detail to Fig. 8, it will be observed that a part of the material delivered at the inlet end of the fitting 37 is diverted through the inner passage defined by the tubes 71, 73 and 77 to the outer end of the end bar section 22. In this instance, the pressure at the inlet end of the tube 71 is relatively higher than that at the opening 66 due to the restriction formed by the tube 71. The diverted material flows back through the outer passage between the tubes and the walls of the end bar section and returns to the fitting 37, where it merges with the nondiverted part of the material and flows through the lateral opening 66 into the intermediate bar section 20.

The entire supply of fluid thus flows through the intermediate bar section 20 and is delivered to the fitting 38 through the lateral opening 66. Due to the large area of the opening 66 relative to the size of the annular passage formed around the tube 71 in the fitting 38, a part of the material is diverted through the outer passage of the end bar section to return through the tubes 77, 73 and 71 to the chamber provided by the universal joint 36, where the material merges with the nondiverted material to flow through the conduit members 30, 29 and 28, valve 17 and return duct 18 to the tank 10. Circulation of material through the conduit system in the above manner effectually prevents freezing or solidifying of the material during nondistributing periods, as when the apparatus is being transported from a supply point to the point of distribution.

It will be understood that the circulation of the material through the distributor bar and supply system is maintained only during nondistributing periods, as for example, when the apparatus is traveling to or from the job. When material is to be distributed, both valves 16 and 17 are set in the position in which the valve 16 is shown in Fig. 8, thus directing the material through both branches of the conduit system to opposite ends of the distributor bar 15. The latter is provided with a series of longitudinally spaced outlets, each fitted with a suitable nozzle 80 (Fig. 5) having a control valve for opening and closing the outlet. Valve operators, herein shown as levers 81, projecting radially from each nozzle, are provided for operating the valves.

Means is provided for actuating all of the valves simultaneously from a single control point which may be located at the driver's seat or accessible to an operating platform at the rear of the vehicle. In the present instance, the operating means, as shown in Fig. 1 includes a vertically disposed rockshaft 82 suitably journaled on the vehicle frame and connected by a linkage 83 with a rocker member 84 operatively connected by a link 86 to an actuating lever 87 pivotally supported on the distributor bar section 20 and operatively connected with the valve levers 81.

The linkage 83 comprises two pairs of laterally spaced parallel rods 83a and 83b, the inner ends of which are pivotally secured to an intermediate rocker bar 83c which is vertically disposed and may be rotatably supported on the frame in any convenient manner.

As shown in Fig. 1, the rocker member 84 is mounted on a bracket 85 carried by the section 20 of the distributor bar. It comprises a body section 84a which carries thereon a crosshead 84b to which the ends of the linkage rods 83b are connected. The body section 84a has a stub shaft 84c journaled in a bearing member 85a on a second perpendicular stub shaft 85b which in turn is journaled in a bearing member 85c on the bracket 85. Thus rotational movement about both horizontal and vertical axes is attained.

Swinging movements are imparted to the valve operating lever 87 in the rotation of the rocker member by a crank arm 84d on the rocker and the link 86, the latter being connected to the crank arm and lever by means of ball and socket joints 86a and 87a. As will be seen by reference to Fig. 1, the link 86 is substantially alined with the bearing members 50 upon which the distributor bar pivots when rocked to draining position. Thus the support and connection of the link 86 and the rocker member 84 are such as to accommodate the movements of the distributor bar. Moreover, the linkage 83 is articulated to enable it to conform to the position of the apparatus when the bar is swung upwardly to the traveling position.

In the exemplary distributor bar the outlet control valves of the intermediate bar section 20 are arranged in two groups, with the operating levers 81 of each group interconnected by a common actuator bar 88. The control valves for the end sections also constitute individual groups with the operating levers 81 of each group interconnected by an actuator bar 89.

The operating lever 87 is connected by links 90 with the actuator bars 88 of the intermediate valve groups and these bars in turn are operatively connected with the bars 89 of the end section valve groups. The latter operative connection is provided in this instance by a connecting mechanism 91 constructed and arranged to permit folding of the end bar section relative to the intermediate bar section.

Referring to Figs. 1 and 5 of the drawings, the connecting mechanism 91 in its preferred form includes a lever member 92 pivotally supported intermediate its ends on a boss 93 rigidly secured on the intermediate bar section 20, in this instance concentric with the boss 47. A similar lever member 94 is pivoted on a boss 95 rigid with the end bar section adjacent that end of the intermediate bar section. The arms of the lever members 92 and 94 are connected by flexible members 96 and 97 whereby the movements of the lever member 92 are transmitted to the member 94 and thence to the valve actuating bar 89 of the end member.

As previously described, the end bar sections are mounted to pivot on the elbow members 61 of the fittings 37 and 38, and the flexible connecting members 96, 97 between the lever members 92 and 94 permit such pivotal or folding movement without requiring disconnection of the actuating means. In order to prevent the flexible members 96, 97 from becoming entangled with the valves when the end bar sections are so folded, these members preferably comprise roller and link chains. The chains are mounted so that there is no tendency to sag against the nozzles 80 or the valve levers 81 mounted thereon, thereby avoiding damage to the equipment.

Provision is made for preventing imposition of excessive strain on the connecting mechanism 91 and associated parts of the distributor bar in case the end section of the bar encounters an obstruction when the vehicle is backed up that will tend to swing the section forwardly. For this purpose, the lever member 92 is provided with arms of slightly greater length than those of the lever member 94, thereby causing one of the flexible connecting members 96, 97 to be drawn taut and the other to become slack, depending upon the position of the lever members. Thus, when the lever members are operated to the position shown in Fig. 5, the upper connecting member 97 is drawn taut, while the member 96 becomes slack, and the condition is reversed when the lever members are rocked to their alternate positions. If the end bar section 21 is forced forwardly from the position shown in Figs. 1, 8 and 9, in which position it is normally held by a spring 98, the slack in the flexible member 97 is taken up in the initial movement of the bar section 21. A stop member 99 carried by the end bar section 21 engages the intermediate bar section 20 preventing further independent movement of the section 21 and transforming further strain from the connecting mechanism 91 to the distributing bar. A slight movement of the valve levers 81 may occur under these conditions, but it is not sufficient to open the valves and it is automatically adjusted when the strain is relieved and the bar section is returned to normal position.

I claim as my invention:

1. In distributing apparatus of the character described, in combination, a distributor bar including two tubular sections, a fitting connecting said bar sections in end-to-end relation, one of said sections being closed at the end remote from said fitting, a supply conduit for delivery of a flow of material to said fitting, said fitting having three longitudinally spaced openings including two end openings communicating respectively with said one bar section and with said supply conduit and an intermediate opening communicating with the other bar section, and means defining a pair of contiguous flow passages extending from said fitting through said one bar section, said passage forming means extending over said intermediate opening to a point adjacent the inlet opening to establish a pressure differential between the end opening communicating with said conduit and said intermediate opening whereby a part of the material delivered through said conduit is diverted into and circulated through said one bar section and then returned to the other bar section.

2. In distributing apparatus of the character described, in combination, a distributor bar including two tubular sections assembled in end-to-end relation, a fitting connecting said sections, one of said sections being closed at the end remote from said fitting, said fitting having an inlet opening communicating with a conduit, means in said fitting cooperating with means in said one bar section to form contiguous flow passages extending from said inlet opening through said one bar section and back to the other bar section, said means also forming a flow passage from said inlet opening directly to said other bar section whereby material introduced through said inlet opening is divided into two streams, one stream circulating through said one bar section and then entering said other bar section and the other stream flowing directly into said other bar section and merging with the material entering from said one bar section.

3. In distributing apparatus of the character described, in combination, a distributor bar including two tubular sections assembled in end-to-end relation, a fitting connecting said sections for relative swinging movement, one of said sections being closed at the end remote from said fitting, said fitting having an opening communicating with a conduit, means in said fitting and in said one bar section cooperating to form a flow passage extending from said opening through said one bar section and a contiguous flow passage extending back to the other bar section, said means also forming a flow passage from said opening directly to said other bar section whereby material flowing through said other bar section in the direction of said fitting is divided into two streams, one stream circulating through said one bar section and passing out through said opening and the other stream flowing directly through said opening.

4. In a distributing system for bituminous material and the like, the combination of a circulating spray bar including a tubular main section, a tubular auxiliary section pivotally supported at each end of said main section, each of said auxiliary sections being closed at its outer end and in communication at its inner end with the adjacent end of said main section, a supply conduit communicating with one end of the main section and the adjacent auxiliary section, a pipe extending through such auxiliary section and communicating at one end with said supply conduit and at the other end with its associated auxiliary section for diverting a portion of the material from said conduit into the auxiliary section adjacent its closed end, said material returning through the auxiliary section and discharging into said main section along with the remainder of the material delivered through said supply conduit, a return conduit communicating with the other end of said main section and the other auxiliary section, and a second pipe extending through said other auxiliary section and terminating at one end adjacent the closed end of said other section and communicating at its other end with said return conduit, a portion of the material discharged from said main section passing directly to said return conduit and the remainder being diverted into said other auxiliary section, the flow of diverted material being directed back to said return conduit by way of said second pipe.

5. In distributing apparatus of the character described, in combination, a distributor bar including two axially alined tubular sections, one of said sections being closed at the end remote from the other section, a conduit, a fitting connecting said conduit to said two bar sections, said fitting having an inner end opening at one end communicating with the conduit and a pair of openings spaced apart axially of the fitting including an outer end opening and an intermediate opening respectively communicating with the two bar sections, and a tube of substantially smaller cross sectional area than said fitting extending therethrough from a point closely adjacent said inner end opening through the outer end opening to a point adjacent the closed end of said one section to provide a return flow passage for the section of the bar connected to the outer end opening, said tube forming with the fitting a passage between said inner end opening and said intermediate opening of a cross sectional area substantially less than the area of the intermediate opening.

6. In a distributor for bituminous materials, a supply conduit, a fitting having an inner end opening connected with said supply conduit, an outer end opening and an intermediate opening, a spray bar comprising a first section connected to said intermediate opening and a second section connected to said outer end opening and having a closed outer end, and an inner pipe extending through the second bar section from a point adjacent the closed outer end thereof through the bar and fitting and having its inner end communicating with said inner end opening of the fitting, said pipe forming with the fitting a flow passage communicating with said intermediate opening and having an effective cross sectional area less than the effective cross-sectional area of said intermediate opening at the point of communication of said flow passage with the latter opening, said pipe being flared outwardly at its inner end.

7. In a distributor for bituminous materials, a supply conduit, a fitting having an inner end opening connected with said supply conduit, an outer end opening and an intermediate opening, a spray bar comprising a first section connected to said intermediate opening and a second section connected to said outer end opening and having a closed outer end, and an inner pipe extending through the second bar section from a point adjacent the closed outer end thereof through the bar and fitting and having its inner end communicating with said inner end opening of the fitting, said pipe forming with the fitting a flow passage communicating with said intermediate opening and having an effective cross sectional area smaller than the effective cross sectional area of said intermediate opening at a point between the inner end opening and the intermediate opening.

8. In a distributor for bituminous materials, a supply conduit, a fitting having an inner end opening connected with said supply conduit, an outer end opening and an intermediate opening, a spray bar comprising a first section connected to said intermediate opening and a second section connected to said outer end opening and having a closed outer end, and an inner pipe extending through the second bar section from a point adjacent the closed outer end thereof through the bar and fitting and having its inner end communicating with said inner end opening of the fitting, said pipe forming with the fitting a flow passage communicating with said intermediate opening and having an effective cross sectional area smaller than the effective cross-sectional area of said intermediate opening at a point between the inner end opening and the intermediate opening, said second bar section being mounted in said fitting for swinging movement relative to the first bar section and said pipe being composed of two connected sections permitting such swinging movement of said second bar section.

9. In distributing apparatus of the character described, in combination, a distributor bar including main and auxiliary axially alined tubular sections, a supply conduit, a fitting connecting said conduit to said two bar sections, said fitting having an opening at one end communicating with the conduit and a pair of laterally facing openings spaced apart axially of the fitting and communicating with the respective bar sections, a tube of substantially smaller diameter than said fitting supported therein with its ends disposed concentric with the end opening in the fitting and the lateral opening remote therefrom, a similarly dimensioned tube extending through the auxiliary bar section communicating with the tube in said fitting, means closing the end of said auxiliary bar section remote from said fitting, connecting means securing said auxiliary bar section to said fitting for swinging movement about an axis concentric with the opening, and a coupling connecting the adjacent ends of said tubes permitting said second mentioned tube to swing with the associated bar section.

10. In distributing apparatus of the character described, in combination, an elongated tubular spray bar, a supply conduit supported with its axis substantially perpendicular to the axis of said bar, said conduit having its end portion bent laterally into U-shaped configuration to provide a short section disposed substantially parallel to the axis of said bar, a fitting providing a universal connection between the end portion of said conduit and said bar, and means supporting said fitting independently of said conduit for rotational movement about a normally horizontal axis, said means including a cantilever swingable about a normally vertical axis spaced from the normally horizontal rotational axis of the fitting.

11. In distributing apparatus of the character described, in combination, an elongated tubular spray bar, a supply conduit supported with its axis substantially perpendicular to the axis of said bar, said conduit having its end portion bent laterally into U-shaped configuration to provide a short section disposed substantially parallel to the axis of said bar, a fitting providing a universal connection between the end section of said conduit and said bar, and means supporting said fitting independently of said conduit for rotational movement about the axis of said end section.

12. In distributing apparatus of the character described, in combination, an elongated tubular spray bar, a supply conduit supported with its axis substantially perpendicular to the axis of said bar, said conduit having its end portion bent laterally into U-shaped configuration to provide a short section disposed substantially parallel to the axis of said bar, a fitting providing a universal connection between the end section of said conduit and said bar, a horizontally swingable arm having an antifriction bearing for supporting said fitting, said bar being rotatable in said bearing between operating and inactive positions.

13. In a distributing apparatus of the character described, in combination, an elongated distributor bar having a series of outlets extending longitudinally along one side thereof, a supply conduit having a portion disposed substantially parallel to said bar, a fitting having an axis substantially parallel to said bar and extending from the side of said bar opposite said one side and providing a flow passage between said conduit and the bar, a universal coupling having relatively rotatable parts connected respectively to said fitting and to said conduit, and means including an antifriction bearing supporting the part of said coupling adjacent said fitting for rotation on the axis of said fitting whereby said bar may be swung to face said outlets either upwardly or rearwardly.

14. In a distributing apparatus of the character described, in combination, an elongated horizontal spray bar element, generally horizontal supply conduits connecting with opposite ends of the bar element and disposed transversely thereof, universal joints in said conduits providing for vertical and horizontal adjustments of the spray bar element, other universal joints in said conduits providing rotational adjustment of the bar element about an axis parallel to its longitudinal axis, and still other universal joints in said conduits providing front to rear adjustments of the bar element transversely of the axis of the bar.

15. In a distributing apparatus of the character described, in combination, an elongated horizontal spray bar element, generally horizontal supply conduits connecting with opposite ends of the bar element and disposed transversely thereof, universal joints in said conduits providing for vertical and horizontal adjustments of the spray bar element, other universal joints in said conduits providing rotational adjustment of the bar element about an axis parallel to its longitudinal axis, still other universal joints in said conduits providing front to rear adjustments of the bar element transversely of the axis of the bar, and means supporting said conduits for vertical and horizontal movement.

16. In a distributing apparatus of the type adapted to be mounted on the chassis of a tank carrying vehicle, the combination of an elongated spray bar disposed transversely of the chassis, supply conduits connecting said bar with the tank carried by the vehicle, a pair of frames operatively associated with the spray bar for supporting the same, means supporting said frames on the chassis including a pair of arms depending therefrom, and brackets carried by said arms supporting said frames for swinging movements about two transversely disposed axes, clamping members for said arms adapted to be attached to the chassis and to define a horizontal axis disposed transversely with respect to the chassis and effective to frictionally clamp said arms to the chassis to permit bodily movement of the supporting frames forwardly or rearwardly of the vehicle when the spray bar encounters an obstacle, and universal joints in said conduits for accommodating the conduits to the different positions of the spray bar.

SAMUEL R. ETNYRE.

REFERENCES CITED

The following references are of record in the file of this patent:

UNITED STATES PATENTS

| Number | Name | Date |
| --- | --- | --- |
| 683,645 | Gibbs | Oct. 1, 1901 |
| 791,397 | Asbury | May 30, 1905 |
| 1,382,731 | Kinney | June 28, 1921 |
| 1,938,829 | Hamer | Dec. 12, 1933 |
| 2,197,231 | Walker | Apr. 16, 1940 |
| 2,352,498 | Rosholt | June 27, 1944 |
| 2,372,065 | Etnyre | Mar. 20, 1945 |
| 2,428,865 | Brosemer | Oct. 14, 1947 |
| 2,472,199 | Etnyre | June 7, 1949 |
| 2,511,386 | Warren | June 13, 1950 |
| 2,512,883 | Warren | June 27, 195 |